United States Patent

Takezawa

(10) Patent No.: US 8,389,163 B2
(45) Date of Patent: Mar. 5, 2013

(54) LITHIUM SECONDARY BATTERY CONTAINING ORGANIC PEROXIDE IN NON-AQUEOUS ELECTROLYTE, POSITIVE ELECTRODE, OR NEGATIVE ELECTRODE

(75) Inventor: Hideharu Takezawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1240 days.

(21) Appl. No.: 10/592,959

(22) PCT Filed: Mar. 14, 2005

(86) PCT No.: PCT/JP2005/004443
§ 371 (c)(1),
(2), (4) Date: Sep. 15, 2006

(87) PCT Pub. No.: WO2005/088761
PCT Pub. Date: Sep. 22, 2005

(65) Prior Publication Data
US 2007/0190419 A1    Aug. 16, 2007

(30) Foreign Application Priority Data
Mar. 16, 2004   (JP) .................................. 2004-074254

(51) Int. Cl.
H01M 10/058   (2010.01)
H01M 4/13   (2010.01)
H01M 4/131   (2010.01)
H01M 4/38   (2006.01)
H01M 10/0567   (2010.01)

(52) U.S. Cl. ........ 429/324; 429/188; 429/212; 429/215; 429/218.1; 429/231.95; 429/199

(58) Field of Classification Search ........ 429/122–225, 429/324–347
See application file for complete search history.

(56) References Cited

U.S. PATENT DOCUMENTS

| | | | |
|---|---|---|---|
| 6,232,021 B1 * | 5/2001 | Negoro | 429/328 |
| 6,465,126 B1 * | 10/2002 | Jannasch et al. | 429/217 |
| 6,489,062 B1 | 12/2002 | Watanabe et al. | |
| 7,183,019 B2 | 2/2007 | Kim et al. | |

(Continued)

FOREIGN PATENT DOCUMENTS

| | | |
|---|---|---|
| CN | 1442915 A | 9/2003 |
| EP | 1 396 894 A2 | 3/2004 |

(Continued)

OTHER PUBLICATIONS

Machine Translation of JP 2004-047317.*
Chinese Office Action, with English translation, issued in Chinese Patent Application No. CN 200580007456, mailed Feb. 29, 2008.

*Primary Examiner* — Jonathan Crepeau
*Assistant Examiner* — Jacob Buchanan
(74) *Attorney, Agent, or Firm* — McDermott Will & Emery LLP (57) ABSTRACT

A lithium secondary battery includes a positive electrode including a positive electrode active material, a negative electrode including a negative electrode active material, and a non-aqueous electrolyte. The positive electrode active material comprises at least one lithium-containing composite oxide represented by the following general formula: $Li_xM^1{}_{1-y}M^2{}_yO_2$ where $M^1$ and $M^2$ are different elements, $M^1$ is Ni or Co, $M^2$ is at least one selected from Ni, Co, Mn, Mg, and Al, $1 \leq x \leq 1.05$, and $0 \leq y \leq 0.7$. The negative electrode active material comprises at least one selected from the group consisting of silicon, tin, a silicon-containing alloy, and a tin-containing alloy. The non-aqueous electrolyte includes an organic peroxide.

9 Claims, 1 Drawing Sheet

U.S. PATENT DOCUMENTS

| | | | |
|---|---|---|---|
| 2002/0031710 A1* | 3/2002 | Kezuka et al. | 429/303 |
| 2003/0170534 A1* | 9/2003 | Kim et al. | 429/137 |
| 2004/0048163 A1 | 3/2004 | Park et al. | |
| 2004/0115529 A1* | 6/2004 | Nakahara et al. | 429/213 |
| 2005/0260500 A1* | 11/2005 | Iwasa et al. | 429/314 |

FOREIGN PATENT DOCUMENTS

| | | |
|---|---|---|
| JP | 2001-148242 | 5/2001 |
| JP | 2003-157896 | 5/2003 |
| JP | 2004-047317 | 2/2004 |

* cited by examiner

LITHIUM SECONDARY BATTERY CONTAINING ORGANIC PEROXIDE IN NON-AQUEOUS ELECTROLYTE, POSITIVE ELECTRODE, OR NEGATIVE ELECTRODE

RELATED APPLICATION

This application is a national phase of PCT/JP2005/004443 filed on Mar. 14, 2005, which claims priority from Japanese Application No. 2004-074254 filed on Mar. 16, 2004, the disclosures of which Applications are incorporated by reference herein. The benefit of the filing and priority dates of the International and Japanese Applications is respectfully requested.

1. Technical Field

The present invention relates to a lithium secondary battery with a high capacity and excellent cycle characteristics.

2. Background Art

Conventionally, nickel-cadmium storage batteries and nickel-metal hydride storage batteries have been mainly used as power sources for driving notebook personal computers, portable communications devices, etc. Recently, electronic devices have been becoming cordless and more portable, thereby creating an increasing demand to heighten the energy density of secondary batteries and reduce their size and weight. To meet such demand, lithium secondary batteries with higher energy densities are being developed.

With respect to the positive electrode active material and negative electrode active material of lithium secondary batteries, a large number of materials have been proposed. For example, particularly carbon materials such as graphite have been commercialized as negative electrode active materials, since they have excellent reversibility and high reliability. Also, metals that are expected to provide higher capacities than carbon materials, such as silicon and tin, and alloy materials including such metals have been studied. Also, as the positive electrode active material, lithium-containing transition metal oxides such as $LiCoO_2$, $LiNiO_2$, and $LiMn_2O_4$ have been proposed.

Recently, the performance of electronic devices has been becoming higher, thereby leading to a demand for batteries with higher capacities and excellent cycle characteristics. For example, in order to improve the deterioration of high-temperature cycle characteristics of batteries that use lithium manganate ($LiMn_2O_4$) as a positive electrode active material, it has been proposed to add an organic peroxide to an electrolyte (see Patent Document 1).

In Patent Document 1, by utilizing the high reactivity of the organic peroxide, a film is formed on the negative electrode, thereby preventing Mn that has leached out of the positive electrode in a charged state at a high temperature from being deposited on the negative electrode active material surface.
Patent Document 1: Japanese Laid-Open Patent Publication No. 2004-47317

DISCLOSURE OF INVENTION

Problem That the Invention Is to Solve

However, since $LiMn_2O_4$ has a lower reversible capacity than other lithium-containing transition metal oxides (e.g., $LiCoO_2$ and $LiNiO_2$), it is theoretically not possible to produce a battery having a higher capacity. Hence, achieving a higher capacity requires the use of a material having a larger reversible capacity than $LiMn_2O_4$. Also, the addition of an organic peroxide to an electrolyte produces the effect of preventing the negative electrode from becoming inactivated by the deposition of Mn, but it does not stop the leaching of Mn from the positive electrode itself. Thus, although the characteristics in the early stage of high temperature cycles up to about 100th cycle are improved, the positive electrode active material surface gradually becomes inactivated due to the leaching of Mn. As a result, if charge/discharge cycles are applied for an extended period of time, a problem of capacity loss arises.

Meanwhile, in heightening battery capacity, it is theoretically necessary to heighten the negative electrode capacity together with the positive electrode capacity. For example, when a negative electrode active material including silicon or tin, which has a high capacity, is used, it undergoes large volume changes upon absorption and desorption of lithium, so that the film usually covering the negative electrode surface may not sufficiently perform the protective function against the electrolyte. It should be noted that the surface of a negative electrode is covered with a film due to reaction with electrolyte components in an early stage of charge. This film is believed to have the function of facilitating the absorption and desorption of lithium, as well as the function of protecting the negative electrode active material from the electrolyte.

If the film formed on the negative electrode surface is physically or chemically unstable, the negative electrode continuously reacts with the electrolyte during charge and discharge, so that a film is further formed on the negative electrode surface. As a result, the charge/discharge efficiency lowers and the internal resistance increases, which may result in degradation of cycle characteristics. Particularly, if the negative electrode active material includes a transition metal, the decomposition reaction of the electrolyte on the negative electrode surface is accelerated, which may result in a further degradation of cycle characteristics.

It is therefore an object of the present invention to provide a lithium secondary battery with a high capacity and excellent cycle characteristics.

Means for Solving the Problem

The present invention relates to a lithium secondary battery including: a positive electrode including a positive electrode active material; a negative electrode including a negative electrode active material; and a non-aqueous electrolyte. The positive electrode active material comprises at least one lithium-containing composite oxide represented by the following general formula: $Li_xM^1_{1-y}M^2_yO_2$ where $M^1$ and $M^2$ are different elements, $M^1$ is Ni or Co, $M^2$ is at least one selected from Ni, Co, Mn, Mg, and Al, $1 \leq x \leq 1.05$, and $0 \leq y \leq 0.7$. The negative electrode active material comprises at least one selected from the group consisting of silicon, tin, a silicon-containing alloy, and a tin-containing alloy. At least one of the positive electrode, the negative electrode, and the non-aqueous electrolyte includes an organic peroxide.

The organic peroxide is at least one selected from the group consisting of hydroperoxides, dialkylperoxides, peroxy esters, diacylperoxides, peroxyketals, and ketone peroxides.

In the lithium secondary battery, it is preferred that the organic peroxide be included in the non-aqueous electrolyte.

When the organic peroxide is included in the non-aqueous electrolyte, it is preferred that the organic peroxide account for 0.1 to 5% by weight of the non-aqueous electrolyte.

In the lithium secondary battery, it is preferred that the organic peroxide be included in the negative electrode.

In the lithium secondary battery, it is preferred that the negative electrode active material comprise a silicon-containing alloy.

In the lithium secondary battery, it is further preferred that the silicon-containing alloy comprise: a solid solution including silicon and at least one transition metal element selected from the group consisting of Ti, Ni, Co, Fe, and Cu; or an alloy including silicon and at least one intermetallic compound selected from the group consisting of $TiSi_2$, TiSi, $CoSi_2$, CoSi, $FeSi_2$, FeSi, $NiSi_2$, NiSi, and $Cu_3Si$.

In the lithium secondary battery, it is further preferred that the intermetallic compound be $TiSi_2$.

Effects of the Invention

The present invention can improve the battery capacity of lithium secondary batteries while improving their cycle characteristics.

BEST MODE FOR CARRYING OUT THE INVENTION

Figure 1:
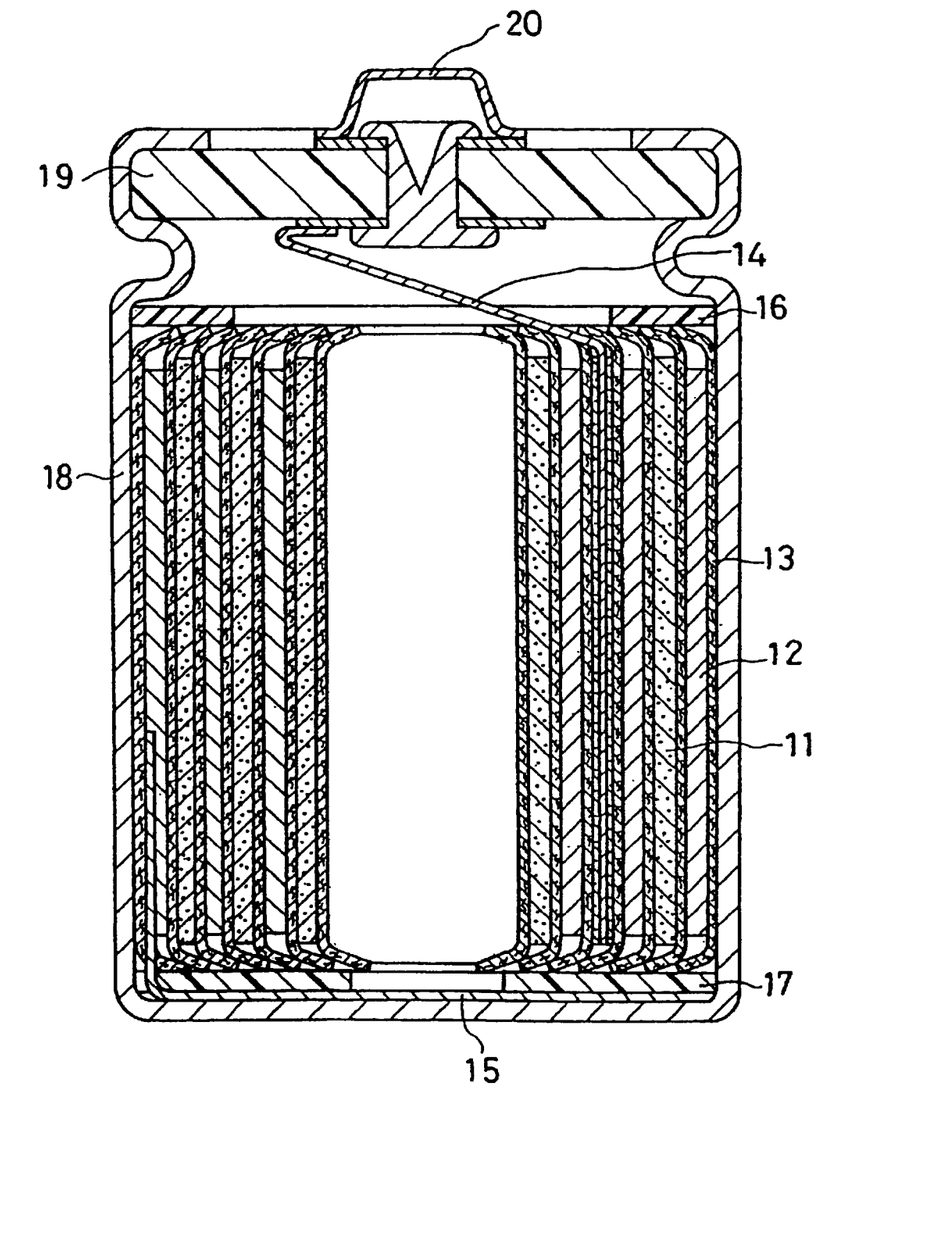
FIG. 1 is a longitudinal sectional view schematically showing a lithium secondary battery in accordance with one embodiment of the present invention.

FIG. 1 shows a lithium secondary battery according to one embodiment of the present invention.

The lithium secondary battery of FIG. 1 includes a stainless steel battery case 18, an electrode plate group contained in the case 18, and a non-aqueous electrolyte (not shown).

The electrode plate group comprises a positive electrode 11, a negative electrode 12, and a polyethylene separator 13, and the positive electrode 11 and the negative electrode 12 are spirally wound with the separator 13 interposed therebetween. An upper insulator plate 16 and a lower insulator plate 17 are placed on top of and under the electrode plate group, respectively. The opening of a case 18 is sealed by crimping the opening edge of the case 18 onto a sealing plate 19.

Also, the positive electrode 11 is fitted with one end of an aluminum positive electrode lead 14, and the other end of the positive electrode lead 14 is connected to the sealing plate 19. The sealing plate 19 is electrically connected to a positive electrode terminal 20. The negative electrode 12 is fitted with one end of a nickel negative electrode lead 15, and the other end of the negative electrode lead 15 is connected to the case 18, which also serves as the negative electrode terminal.

The positive electrode 11 includes a positive electrode current collector and a positive electrode active material layer carried by the positive electrode current collector. Likewise, the negative electrode 12 includes a negative electrode current collector and a negative electrode active material layer carried by the negative electrode current collector.

In the present invention, lithium-containing composite oxides represented by the general formula: $Li_xM^1_{1-y}M^2_yO_2$ ($M^1$ and $M^2$ are different elements, $M^1$ is Ni or Co, $M^2$ is at least one selected from the group consisting of Ni, Co, Mn, Mg, and Al, $1 \leq x \leq 1.05$, and $0 \leq y \leq 0.7$) are used as positive electrode active materials.

Among them, it is preferred to use a lithium-containing composite oxide (A) represented by $Li_aCo_{1-b}Mg_bO_2$ ($1 \leq a \leq 1.05$, $0.005 \leq b \leq 0.1$), a lithium-containing composite oxide (B) represented by $Li_aNi_{1-b}Co_bO_2$ ($1 \leq a \leq 1.05$, $0.1 \leq b \leq 0.35$), or a lithium composite oxide (C) represented by $Li_aNi_{1-(b+c)}Mn_bCo_cO_2$ ($1 \leq a \leq 1.2$, $0.1 \leq b \leq 0.5$, $0.1 \leq c \leq 0.5$) as a positive electrode active material.

In the lithium-containing composite oxide (A), by replacing 0.5% to 10% by mole of cobalt with magnesium, it is possible to suppress, for example, lattice distortion, structural destruction, and particle cracking of the positive electrode active material during charge and discharge.

In the lithium-containing composite oxide (B), by replacing 10% to 35% by mole of Ni with Co, it becomes possible to suppress a change in crystal structure caused by charge and discharge, thereby providing a positive electrode active material with a high capacity and excellent cycle characteristics.

Also, in the lithium composite oxide (B), 1% to 10% by mole of Ni may be replaced with Al in order to improve thermal stability.

In the lithium composite oxide (C), 10 to 50% by mole of Ni is replaced with Co, and further, 10 to 50% by mole of Ni is replaced with Mn. Thus, the lithium composite oxide (C) is an inexpensive material, but has higher capacity than the commonly known manganese spinel oxide, $LiMn_2O_4$, since it contains Ni.

The above-mentioned lithium composite oxides (A) to (C) may be used singly or in combination of two or more of them.

As the negative electrode active material, a material having a higher theoretical capacity than carbon materials such as graphite is used. Such materials include: metal materials such as silicon (Si), tin (Sn), and aluminum (Al); alloys and intermetallic compounds including the above-mentioned metal materials; and lithium (Li) metal. Among them, at least one selected from the group consisting of metals such as Si or Sn, Si-containing alloys, and Sn-containing alloys is preferable since they have high capacities. Further, Si is more preferable as the negative electrode active material, since it has both large volume capacity density and large weight capacity density.

When the negative electrode active material includes Si, the negative electrode active material preferably includes a phase that neither absorbs nor desorbs lithium in addition to the Si phase, in order to effectively suppress volume changes during charge and discharge while maintaining the high capacity.

For example, when the negative electrode active material is a silicon-containing alloy, exemplary phases that neither absorb nor desorb lithium include: phases comprising silicon and at least one transition metal selected from Ti, Ni, Co, Fe, Cu, Zr and the like; alloy phases comprising silicon and the above-mentioned at least one transition metal; intermetallic compound phases comprising silicon and the above-mentioned at least one transition metal; and conductive ceramics phases comprising TiN, TiC, $TiB_2$, $SnO_2$, $In_2O_3$, or the like.

Among them, phases comprising silicon and at least one transition metal selected from the group consisting of Ti, Ni, Co, Fe and Cu, alloy phases comprising silicon and the above-mentioned at least one transition metal, and intermetallic compound phases comprising silicon and the above-mentioned at least one transition metal are preferred. Exemplary phases comprising silicon and at least one transition metal selected from Ti, Ni, Co, Fe, Cu, Zr, and the like include: solid solution phases comprising silicon and at least one transition metal element selected from the group consisting of Ti, Ni, Co, Fe and Cu; and alloy phases comprising silicon and at least one intermetallic compound selected from the group consisting of $TiSi_2$, TiSi, $CoSi_2$, CoSi, $FeSi_2$, FeSi, $NiSi_2$, NiSi, and $Cu_3Si$.

In this case, it is further preferred that the above-mentioned at least one transition metal include Ti. Also, among these phases, phases comprising $TiSi_2$ are particularly preferred. This is because $TiSi_2$ has a high electronic conductivity.

It should be noted that a mixture of the above-mentioned material, such as alloy, with carbon material, such as graphite, may be used as the negative electrode active material unless the feature of high capacity is impaired.

The non-aqueous electrolyte contains a non-aqueous solvent and a lithium salt dissolved in the non-aqueous solvent. Exemplary non-aqueous solvents include: cyclic carbonates with a saturated hydrocarbon group, such as ethylene carbonate, propylene carbonate, and butylene carbonate; cyclic carbonates with a saturated hydrocarbon group, such as vinylene carbonate and vinyl ethylene carbonate; cyclic carboxylic acid esters such as γ-butyrolactone, γ-valerolactone, and furanone; chain carbonates such as diethyl carbonate, ethyl methyl carbonate, and dimethyl carbonate; chain ethers such as 1,2-dimethoxy ethane, 1,2-diethoxy ethane and ethoxymethoxymethane; cyclic ethers such as tetrahydrofuran and 2-methyltetrahydrofuran; aprotic organic solvents such as dimethyl sulfoxide, 1,3-dioxolane, formamide, acetamido, dimethylformamide, dioxolane, acetonitrile, propanenitrile, nitromethane, ethyl monoglyme, phosphoric acid ester derivatives, trimethoxymethane, dioxolane derivatives, sulfolane, methylsulfolane, 1,3-dimethyl-2-imidazolidinone, 3-methyl-2-oxazolidinone, ethyl ether, 1,3-propanesultone, anisole, dimethyl sulfoxide, and N-methylpyrrolidone. These non-aqueous solvents may be used singly or in combination of two or more of them.

It should be noted that the non-aqueous solvent is not to be limited to those listed above; unless the effects of the invention are impaired, it is also possible to use, as the non-aqueous solvent, cyclic carbonates, cyclic carboxylic acid esters, and chain carbonates in which a part of the hydrocarbon group is replaced with a halogen element such as fluorine.

Exemplary lithium salts include $LiPF_6$, $LiBF_4$, and $LiAsF_6$. It is also possible to use lithium perfluoroalkyl sulfonic acid imides, such as $LiN(CF_3SO_2)_2$, $LiN(C_4F_9SO_2)_2$ and $LiN(CF_3SO_2)(C_4F_9SO_2)$, lithium perfluoroalkyl sulfonic acid methides, such as $LiC(CF_3SO_2)_2$, and the like. These lithium salts may be used singly or in combination of two or more of them.

Further, in the present invention, at least one of the positive electrode, the negative electrode and the non-aqueous electrolyte includes an organic peroxide.

The organic peroxide includes at least one selected from the group consisting of hydroperoxides, dialkylperoxides, peroxy esters, diacylperoxides, peroxyketals, and ketone peroxides.

Exemplary hydroperoxides include: those with a saturated hydrocarbon group or an aromatic hydrocarbon group, such as methyl hydroperoxide, ethyl hydroperoxide, isopropyl hydroperoxide, t-butyl hydroperoxide, and cumene peroxide; and peracids such as performic acid, peracetic acid, and m-chloroperbenzoic acid.

Exemplary dialkylperoxides include diethyl peroxide, di-t-butyl peroxide, dicumyl peroxide, 2,5-dimethyl-2,5-t-butylperoxy hexane, 1,3-bis-t-butylperoxy isopropyl benzene, t-butyl cumyl peroxide, and di-t-butyl peroxide.

Exemplary peroxy esters include α-cumyl peroxyneodecanate, and exemplary diacylperoxides include diisobutyryl peroxide, bis-3,5,5-trimethyl hexanoyl peroxide, dilauroyl peroxide, and benzoyl peroxide. Also, peroxyketals include 1,1-di-t-butylperoxy cyclohexane.

Exemplary ketone peroxides include acetyl acetone peroxide, cyclohexanone peroxide, and methyl ethyl ketone peroxide.

The organic peroxide included in the battery reacts with the negative electrode, so that a film comprising the organic peroxide is formed on the negative electrode. Since organic peroxides are highly reactive, the film comprising the organic peroxide is formed in an earlier stage than a film comprising non-aqueous electrolyte components such as a non-aqueous solvent and a solute. Also, since this film is dense and firm, it has excellent stability. Thus, this film suppresses decomposition of non-aqueous electrolyte components, thereby preventing continuous formation of a film comprising non-aqueous electrolyte components. Accordingly, it becomes possible to reduce degradation of charge/discharge efficiency.

Also, the film comprising the organic peroxide is also formed on the positive electrode, and it is believed that the contact between the positive electrode active material and the non-aqueous electrolyte is reduced. Hence, it is possible to reduce leaching of metal elements from the positive electrode active material and prevent the positive electrode active material surface from becoming inactivated.

Also, the use of the above-mentioned positive electrode active material and negative electrode active material makes it possible to improve battery capacity.

As described above, the present invention uses the above-described positive electrode active material, negative electrode active material, and organic peroxide in combination. This makes it possible to reduce continuous formation of a film on the negative electrode due to decomposition of non-aqueous electrolyte components and suppress leaching of metal elements from the positive electrode active material. Accordingly, it is possible to improve battery capacity while improving cycle characteristics relative to conventional ones.

When the organic peroxide is included in the positive electrode active material layer, it is preferred that the organic peroxide account for 0.01 to 0.1% by weight of the positive electrode active material layer.

When the organic peroxide is included in the negative electrode active material layer, it is preferred that it account for 0.01 to 0.1% by weight of the negative electrode active material layer.

When the organic peroxide is included in the non-aqueous electrolyte, it is preferred that the organic peroxide account for 0.1 to 5% by weight of the non-aqueous electrolyte. If the amount of the organic peroxide is less than 0.1% by weight, the effect of protecting the negative electrode may not be sufficient, thereby resulting in degradation of cycle characteristics. If the amount of the organic peroxide exceeds 5% by weight, the lithium-ion conductivity of the non-aqueous electrolyte may lower, thus leading to deterioration of rate characteristics.

It is preferred that the organic peroxide be included in the negative electrode, in order to prevent metal elements from leaching out of the positive electrode active material and to facilitate the formation of the film comprising the organic peroxide on the negative electrode.

As described above, the inclusion of the above-described positive electrode active material, negative electrode active material and organic peroxide makes it possible to achieve high voltage and high capacity while improving cycle characteristics.

The organic peroxide may be added to the positive electrode and/or negative electrode by various methods. For example, when the organic peroxide is added to the negative electrode, a predetermined amount of the organic peroxide may be added to a negative electrode mixture paste comprising the negative electrode active material, a conductive agent, and a binder. Also, by immersing a prepared negative electrode plate in a solvent containing the organic peroxide for a given period of time, the organic peroxide can be included in the negative electrode. This also applies to the positive electrode.

Also, when the organic peroxide is included in the non-aqueous electrolyte, a predetermined amount of the organic peroxide may be added to the non-aqueous electrolyte.

The lithium secondary battery according to the present invention may have any shape. For example, the present invention is applicable to lithium secondary batteries of any type, such as coin-type, button-type, sheet-type, layered-type, cylindrical-type, flat-type, rectangular-type, or large-type such as those used in electric vehicles.

The present invention is hereinafter described more specifically by way of Examples. These examples, however, are not to be construed as limiting in any way the present invention.

Example 1

(Batteries A1 to A7)

(Negative Electrode Preparation)

A Ti—Si alloy obtained by a melting method was used as the starting material, and a negative electrode active material was prepared by a mechanical alloying method using the starting material. In the starting material, the Ti/Si ratio was 37% by weight of Ti/63% by weight of Si. Also, the mechanical alloying was performed using a vibration ball mill (available from Chuo Kakohki Industries, Ltd., item code: FV-30) equipped with a stainless steel container with an internal volume of 95 liters.

Specifically, 2.5 kg of the starting material and 300 kg of 1-inch-diameter stainless steel balls were placed into the container of the vibration ball mill, and the pressure inside the container was reduced. Next, argon gas was introduced into the container until the pressure therein became 1 atmospheric pressure. Subsequently, mechanical alloying was performed for 72 hours with the amplitude of the vibration ball mill set to 8 mm and the revolution frequency of the drive motor set to 1200 rpm.

The identification of the product obtained by the mechanical alloying and the evaluation of its crystal state were carried out by X-ray diffraction analysis. CuKα radiation was used as the X-ray source, with the acceleration voltage set to 50 kV and the acceleration current set to 150 mA. As a result, only the peak attributed to $TiSi_2$ was observed, and no peak attributable to Si crystal was found. The negative electrode active material produced was found to have two phases consisting of an amorphous Si phase and a crystalline $TiSi_2$ phase.

The alloy obtained by the mechanical alloying was classified, and the classified particles with a mean particle size of 5 μm were used as the negative electrode active material.

A negative electrode mixture paste was prepared by mixing 75 parts by weight of the negative electrode active material, 15 parts by weight of acetylene black (available from Denki Kagaku Kogyo K.K., trade name: DENKA BLACK, mean primary particle size: 40 nm) serving as a conductive agent, and 10 parts by weight of polyacrylic acid serving as a binder with pure water and kneading the mixture. At this time, the addition of polyacrylic acid was done by using an aqueous polyacrylic acid solution (available from Wako Pure Chemical Industries, Ltd., polyacrylic acid solid content: 25% by weight).

The resultant negative electrode mixture paste was applied onto a current collector made of a 10-μm-thick electrolytic copper foil by a doctor blade process and rolled to a suitable thickness. This was then dried at 100° C. for 12 hours, to obtain a negative electrode. It should be noted that the above-mentioned acetylene black was in the form of agglomerated primary particles. This also applies to the following Examples.

(Positive Electrode Preparation)

$LiCo_{0.98}Mg_{0.02}O_2$ was used as the positive electrode active material. The preparation method of $LiCo_{0.98}Mg_{0.02}O_2$ is described below.

An aqueous solution containing cobalt sulfate at a concentration of 0.98 mol/L and magnesium sulfate at a concentration of 0.02 mol/L was continuously supplied to a reaction vessel, and sodium hydroxide was dropped into the reaction vessel such that the pH of the aqueous solution was 10 to 13. In this way, a composite hydroxide including cobalt and magnesium, which was an active material precursor, was synthesized. The precursor was thoroughly washed with water, followed by drying. The composition of the resultant precursor was $Co_{0.98}Mg_{0.02}(OH)_2$.

The precursor obtained in the above manner and lithium carbonate were mixed together such that the molar ratio of lithium/cobalt/magnesium was 1:0.98:0.02, to form a mixture. This mixture was preliminarily baked at 600° C. for 10 hours, to obtain a preliminarily baked material. The preliminarily baked material was then pulverized, and the pulverized preliminarily baked material was again baked at 900° C. for 10 hours, to obtain a baked material. The resultant baked material was pulverized and classified, to obtain a positive electrode active material represented by the formula $LiCo_{0.98}Mg_{0.02}O_2$. The mean particle size of the resultant positive electrode active material was 7 μm.

90 parts by weight of $LiCo_{0.98}Mg_{0.02}O_2$ powder, 2 parts by weight of acetylene black serving as a conductive agent, 3 parts by weight of polyvinylidene fluoride powder serving as a binder were mixed together, to form a mixture. N-methyl-2-pyrrolidone was added to the resultant mixture, to form a positive electrode mixture paste. This positive electrode mixture paste was applied onto a positive electrode current collector made of a 15-μm-thick aluminum foil by a doctor blade process and then thoroughly dried, to obtain a positive electrode.

(Non-aqueous Electrolyte Preparation)

Non-aqueous electrolytes A1 to A7 were prepared by dissolving $LiPF_6$ at a concentration of 1M in a solvent mixture of ethylene carbonate (EC) and ethyl methyl carbonate (EMC) in a volume ratio of 1:1, and adding an organic peroxide as shown in Table 1 to the resultant solution. The amount of the organic peroxide was made 5% by weight of the non-aqueous electrolyte. Also, the organic peroxides used were those available on the market.

(Cylindrical Battery Production)

A cylindrical battery as illustrated in FIG. 1 was produced.

First, an aluminum positive electrode lead 14 was attached to a positive electrode 11 by ultrasonic welding. Likewise, a copper negative electrode lead 15 was attached to a negative electrode 12. Subsequently, the positive electrode 11 and the negative electrode 12 were spirally wound with a belt-like separator 13 made of porous polyethylene interposed therebetween, to form an electrode group. The separator 13 used was wider than the positive electrode and the negative electrode.

An upper insulator plate 16 and a lower insulator plate 17, both of which were made of polypropylene, were mounted on top of and under the resultant electrode group, respectively, and the electrode group was then inserted into a battery case 18. The other end of the positive electrode lead 14 was coupled to the back face of a sealing plate 19 that was electrically connected to a positive electrode terminal 20. Also, the other end of the negative electrode lead 15 was coupled to the bottom face of the battery case 18.

Thereafter, a predetermined amount of the non-aqueous electrolyte A1 was injected into the battery case 18, and the opening edge of the battery case 18 was crimped onto the sealing plate 19, to seal the battery. In this way, a lithium secondary battery was produced. This battery was designated as a battery A1.

Also, lithium secondary batteries were produced in the same manner as in the production of the battery A1, except for the use of the non-aqueous electrolytes A2 to A7. The resultant batteries were designated as batteries A2 to A7.

(Batteries A8 and A9)

Batteries A8 and A9 were produced in the same manner as in the production of the battery A1, except that a negative electrode including a Si thin film as the negative electrode active material was used and that cumene peroxide or m-chloroperbenzoic acid was used as the organic peroxide included in the non-aqueous electrolyte.

The negative electrode including a Si thin film was produced as follows.

A 7-μm-thick silicon layer was formed on a negative electrode current collector made of a 20-μm-thick copper foil by RF magnetron sputtering using silicon as the target. RF magnetron sputtering was performed using an RF magnetron sputtering device whose vacuum chamber was equipped with a rotary drum. The sputtering was performed by reducing the pressure of the vacuum chamber to $8\times10^{-4}$ Pa or less and introducing argon gas into the vacuum chamber at a flow rate of 50 sccm. RF electric power was 350 W. The negative electrode current collector was secured to the rotary drum in the vacuum chamber.

(Battery A10)

A lithium secondary battery was produced in the same manner as in the production of the battery A2, except for the use of lithium cobaltate ($LiCoO_2$) as the positive electrode active material. The resultant battery was designated as a battery A10. Lithium cobaltate was produced as follows.

Lithium carbonate ($Li_2CO_3$) and cobalt carbonate ($CoCO_3$) were mixed together in a predetermined molar ratio, to form a mixture. This mixture was baked at 900° C., to obtain a baked material. The resultant baked material was pulverized and classified, to obtain a positive electrode active material represented by the formula $LiCoO_2$. The mean particle size of the resultant positive electrode active material was 8.5 μm.

(Battery A11)

A lithium secondary battery was produced in the same manner as in the production of the battery A2, except for the use of $LiNi_{0.85}Co_{0.15}O_2$ as the positive electrode active material. The resultant battery was designated as a battery A11.

The method for producing $LiNi_{0.85}Co_{0.15}O_2$ is described below.

An aqueous solution containing nickel sulfate at a concentration of 0.85 mol/L and cobalt sulfate at a concentration of 0.15 mol/L was continuously supplied to a reaction vessel, while sodium hydroxide was dropped into the reaction vessel such that the pH of the aqueous solution was 10 to 13. In this way, a composite hydroxide including nickel and cobalt, which was an active material precursor, was synthesized. The precursor was thoroughly washed with water and dried. The composition of the resultant precursor was $Ni_{0.85}Co_{0.15}(OH)_2$.

The precursor thus obtained and lithium carbonate were mixed together such that the molar ratio of lithium/nickel/cobalt was 1:0.85:0.15, to form a mixture. This mixture was preliminarily baked at 500° C. for 7 hours in an oxygen atmosphere, to obtain a preliminarily baked material. The preliminarily baked material was then pulverized, and the pulverized preliminarily baked material was again baked at 800° C. for 15 hours, to obtain a baked material. The resultant baked material was pulverized and classified, to obtain a positive electrode active material represented by the formula $LiNi_{0.85}Co_{0.15}O_2$. The mean particle size of the resultant positive electrode active material was 9.5 μm.

(Battery A12)

A lithium secondary battery was produced in the same manner as in the production of the battery A2, except for the use of $LiNi_{0.83}Co_{0.15}Al_{0.02}O_2$ as the positive electrode active material. The resultant battery was designated as a battery A12. Herein, $LiNi_{0.83}Co_{0.15}Al_{0.02}O_2$ was produced as follows.

An aqueous solution containing nickel sulfate at a concentration of 0.83 mol/L, cobalt sulfate at a concentration of 0.15 mol/L, and aluminum sulfate at a concentration of 0.02 mol/L was continuously supplied to a reaction vessel, while sodium hydroxide was dropped into the reaction vessel such that the pH of the aqueous solution was 10 to 13. In this way, a composite hydroxide including nickel, cobalt, and aluminum, which was an active material precursor, was synthesized. The precursor was thoroughly washed with water and dried. The composition of the resultant precursor was $Ni_{0.83}Co_{0.15}Al_{0.02}(OH)_2$.

The precursor thus obtained and lithium carbonate were mixed together such that the molar ratio of lithium/nickel/cobalt/aluminum was 1:0.83:0.15:0.02, to form a mixture. This mixture was preliminarily baked at 500° C. in an oxygen atmosphere for 7 hours, to obtain a preliminarily baked material. The preliminarily baked material was then pulverized, and the pulverized preliminarily baked material was again baked at 800° C. for 15 hours, to obtain a baked material. The resultant baked material was pulverized and classified, to obtain a positive electrode active material represented by the formula $LiNi_{0.83}Co_{0.15}Al_{0.02}O_2$. The mean particle size of the resultant positive electrode active material was 10 μm.

(Battery A13)

A lithium secondary battery was produced in the same manner as in the production of the battery A2, except for the use of $LiNi_{1/3}Mn_{1/3}Co_{1/3}O_2$ as the positive electrode active material. The resultant battery was designated as a battery A13. Herein, $LiNi_{1/3}Mn_{1/3}Co_{1/3}O_2$ was produced as follows. In this positive electrode active material, the sum of the molar ratios of Ni, Mn, and Co is 1, and the molar ratio of Ni, the molar ratio of Mn, and the molar ratio of Co are the same.

An aqueous solution containing equal moles of nickel sulfate, manganese sulfate, and cobalt sulfate, with their total being 1 mol/L, was continuously supplied to a reaction vessel, while sodium hydroxide was dropped into the reaction vessel such that the pH of the aqueous solution was 10 to 13. In this way, a composite hydroxide including nickel, manganese, and cobalt, which was an active material precursor, was synthesized. The precursor was thoroughly washed with water and dried. The composition of the resultant precursor was $Ni_{1/3}Mn_{1/3}Co_{1/3}(OH)_2$.

The precursor thus obtained and lithium carbonate were mixed together such that the molar ratio of lithium/nickel/manganese/cobalt was 1:1/3:1/3:1/3, to form a mixture. This mixture was preliminarily baked at 500° C. in an oxygen atmosphere for 7 hours, to obtain a preliminarily baked material. The preliminarily baked material was then pulverized, and the pulverized preliminarily baked material was again baked at 800° C. for 15 hours, to obtain a baked material. The resultant baked material was pulverized and classified, to obtain a positive electrode active material represented by the formula $LiNi_{1/3}Mn_{1/3}Co_{1/3}O_2$. The mean particle size of the resultant positive electrode active material was 10 µm.

(Comparative Batteries 1 and 2)

Lithium secondary batteries were produced in the same manner as in the production of the battery A1, except for the use of $LiCo_{0.98}Mg_{0.02}O_2$ as the positive electrode active material, the use of the Ti—Si alloy or Si thin film as the negative electrode active material, and the use of a non-aqueous electrolyte containing no organic peroxide. The resultant batteries were designated as comparative batteries 1 and 2, respectively.

(Comparative Battery 3)

A lithium secondary battery was produced in the same manner as in the production of the battery A1, except for the use of graphite (mean particle size 20 µm) as the negative electrode active material instead of the Ti—Si alloy, and the use of m-chloroperbenzoic acid as the organic peroxide included in the non-aqueous electrolyte. The resultant battery was designated as a comparative battery 3.

(Comparative Battery 4)

A lithium secondary battery was produced in the same manner as in the production of the battery A1, except for the use of graphite (mean particle size 20 µm) as the negative electrode active material instead of the Ti—Si alloy, and the use of a non-aqueous electrolyte containing no organic peroxide. The resultant battery was designated as a comparative battery 4.

(Comparative Battery 5)

A lithium secondary battery was produced in the same manner as in the production of the battery A1, except for the use of $LiMn_2O_4$ (mean particle size 8 µm) as the positive electrode active material, the use of the Ti—Si alloy as the negative electrode active material, and the use of m-chloroperbenzoic acid as the organic peroxide included in the non-aqueous electrolyte. The resultant battery was designated as a comparative battery 5.

(Comparative Battery 6)

A lithium secondary battery was produced in the same manner as in the production of the battery A1, except for the use of $LiMn_2O_4$ as the positive electrode active material, the use of graphite as the negative electrode active material, and the use of m-chloroperbenzoic acid as the organic peroxide included in the non-aqueous electrolyte. The resultant battery was designated as a comparative battery 6.

(Evaluation)

Using the batteries A1 to A13 and comparative batteries 1 to 6, a charge/discharge cycle test was performed at 45° C. as follows.

First, each battery was charged at a charge current of 0.2 C (1 C is the current value at the 1-hour rate) up to 4.15 V and discharged at a current of 0.2 C until the battery voltage reached 2.5 V, which constituted one cycle. This charge/discharge cycle was repeated 100 times. The discharge capacity at the 1st cycle was defined as battery capacity (mAh).

In this cycle test, there was a 30-minute interval after the completion of charge or after the completion of discharge.

The ratio of the discharge capacity at the 100th cycle to the discharge capacity at the 1st cycle was expressed as a percentage, and this value was defined as capacity retention rate (%). Table 1 shows the results. It should be noted that the cycle life is better as the capacity retention rate is closer to 100%. Table 1 also shows the organic peroxides included in the non-aqueous electrolytes and battery capacity.

TABLE 1

| | Positive electrode active material | Negative electrode active material | Organic peroxide | Battery capacity (mAh) | Capacity retention rate (%) |
|---|---|---|---|---|---|
| Battery A1 | $LiCo_{0.98}Mg_{0.02}O_2$ | Ti—Si alloy | Cumene peroxide | 2635 | 79 |
| Battery A2 | $LiCo_{0.98}Mg_{0.02}O_2$ | Ti—Si alloy | m-chloroperbenzoic acid | 2642 | 85 |
| Battery A3 | $LiCo_{0.98}Mg_{0.02}O_2$ | Ti—Si alloy | Diethyl peroxide | 2611 | 76 |
| Battery A4 | $LiCo_{0.98}Mg_{0.02}O_2$ | Ti—Si alloy | α-cumyl peroxyneodecanate | 2629 | 74 |
| Battery A5 | $LiCo_{0.98}Mg_{0.02}O_2$ | Ti—Si alloy | Benzoyl peroxide | 2623 | 77 |
| Battery A6 | $LiCo_{0.98}Mg_{0.02}O_2$ | Ti—Si alloy | 1,1-di-t-butylperoxy cyclohexane | 2590 | 67 |
| Battery A7 | $LiCo_{0.98}Mg_{0.02}O_2$ | Ti—Si alloy | Acetyl acetone peroxide | 2636 | 72 |
| Battery A8 | $LiCo_{0.98}Mg_{0.02}O_2$ | Si thin film | Cumene peroxide | 2640 | 78 |
| Battery A9 | $LiCo_{0.98}Mg_{0.02}O_2$ | Si thin film | m-chloroperbenzoic acid | 2725 | 82 |
| Battery A10 | $LiCoO_2$ | Ti—Si alloy | m-chloroperbenzoic acid | 2655 | 83 |
| Battery A11 | $LiNi_{0.85}Co_{0.15}O_2$ | Ti—Si alloy | m-chloroperbenzoic acid | 2870 | 80 |
| Battery A12 | $LiNi_{0.83}Co_{0.15}Al_{0.02}O_2$ | Ti—Si alloy | m-chloroperbenzoic acid | 2802 | 83 |
| Battery A13 | $LiNi_{1/3}Co_{1/3}Mn_{1/3}O_2$ | Ti—Si alloy | m-chloroperbenzoic acid | 2585 | 85 |
| Compara. battery 1 | $LiCo_{0.98}Mg_{0.02}O_2$ | Ti—Si alloy | None | 2635 | 57 |
| Compara. battery 2 | $LiCo_{0.98}Mg_{0.02}O_2$ | Si thin film | None | 2750 | 55 |
| Compara. battery 3 | $LiCo_{0.98}Mg_{0.02}O_2$ | Graphite | m-chloroperbenzoic acid | 2280 | 82 |
| Compara. battery 4 | $LiCo_{0.98}Mg_{0.02}O_2$ | Graphite | None | 2284 | 80 |
| Compara. battery 5 | $LiMn_2O_4$ | Ti—Si alloy | m-chloroperbenzoic acid | 2250 | 73 |
| Compara. battery 6 | $LiMn_2O_4$ | Graphite | m-chloroperbenzoic acid | 1923 | 79 |

As shown in Table 1, the batteries A1 to A13 exhibited improved cycle characteristics relative to the comparative batteries 1 to 2 including no organic peroxide.

On the other hand, in the case of the comparative battery 4 using graphite as the negative electrode active material and including no organic peroxide, its battery capacity was small.

When the battery A2 is compared with the comparative battery 3 where only the negative electrode active material is different, the comparative battery 5 where only the positive electrode active material is different, or the comparative battery 6 where both positive electrode active material and negative electrode active material are different, it can be seen that the battery A2 is improved in both battery capacity and capacity retention rate. This is probably because the combination of the positive electrode active material including the lithium-containing composite oxide, negative electrode active material including Si or the like, and organic peroxide according to the present invention could prevent the continuous formation of a film comprising non-aqueous electrolyte components, as compared with conventional cases, thereby suppressing degradation of cycle characteristics.

Also, the results of the batteries A11 to 13 indicate that the inclusion of the metal element, such as Al or Mn, in the positive electrode active material further suppresses degradation of cycle characteristics.

Also, besides the organic peroxides used in this example, the use of organic peroxides such as hydroperoxides, dialkylperoxides, peroxy esters, diacylperoxides, peroxyketals, and ketone peroxides can also produce essentially the same results.

Further, the use of positive electrode active materials in which cobalt or nickel is replaced with an element other than Al and Mn, or in which the ratio of the substituted other element is changed, can produce essentially the same results.

Although this example used the Ti—Si alloy or Si thin film as the negative electrode active material, the use of metals that are composed only of one element and capable of absorbing and desorbing lithium other than Si, alloys including such metals, or lithium metal as the negative electrode active material can also produce essentially the same effects.

Example 2

In this example, the content of an organic peroxide in the non-aqueous electrolyte was varied.
(Batteries B1 to B7)

Non-aqueous electrolytes were prepared by dissolving $LiPF_6$ at a concentration of 1M in a solvent mixture of ethylene carbonate (EC) and ethyl methyl carbonate (EMC) in a volume ratio of 1:1 and adding an organic peroxide of m-chloroperbenzoic acid thereto. At this time, the amount of the organic peroxide was varied to 0.05% by weight, 0.1% by weight, 0.5% by weight, 1% by weight, 5% by weight or 10% by weight, of the non-aqueous electrolyte. The resultant non-aqueous electrolytes were designated as non-aqueous electrolytes B1 to B6, respectively.

Lithium secondary batteries were produced in the same manner as in the production of the battery A1, except for the use of these non-aqueous electrolytes. The resultant batteries were designated as battery B1 to battery B6.

Using the batteries B1 to B6 thus obtained, their capacity retention rates were measured in the same manner as in Example 1. Table 2 shows the results. Table 2 also shows the ratios of the organic peroxide relative to the non-aqueous electrolyte (% by weight).

TABLE 2

| | Ratio of organic peroxide to non-aqueous electrolyte (wt %) | Capacity retention rate (%) |
| --- | --- | --- |
| Battery B1 | 0.05 | 48 |
| Battery B2 | 0.1 | 77 |
| Battery B3 | 0.5 | 85 |
| Battery B4 | 1.0 | 80 |
| Battery B5 | 5.0 | 76 |
| Battery B6 | 10 | 54 |

The results of Table 2 indicate that the cycle characteristics are improved by making the amount of the organic peroxide 0.1% by weight to 5% by weight of the non-aqueous electrolyte. It should be noted that even when other organic peroxides than m-chloroperbenzoic acid were used, essentially the same tendency could be obtained by making the amount of the organic peroxide 0.1 to 5% by weight of the non-aqueous electrolyte.

Example 3

In this example, batteries with an organic peroxide included in the non-aqueous electrolyte, negative electrode, or positive electrode were evaluated.
(Battery C1)
(Negative Electrode Preparation)

A negative electrode mixture was prepared by mixing 75 parts by weight of the Ti—Si alloy produced in Example 1, serving as the negative electrode active material, 15 parts by weight of acetylene black (Denki Kagaku Kogyo K.K., trade name: DENKA BLACK, mean primary particle size: 40 nm), and 10 parts by weight of polyvinylidene fluoride (PVDF). 100 parts by weight of this negative electrode mixture was mixed with 0.05 part by weight of m-chloroperbenzoic acid, to form a mixture. N-methyl-2-pyrrolidone was added to this mixture, to prepare a negative electrode mixture paste. This negative electrode mixture paste was applied onto a negative electrode current collector made of a 10-µm-thick electrolytic copper foil by a doctor blade process, rolled to a suitable thickness, and dried at 60° C., to obtain a negative electrode.
(Positive Electrode Preparation)

$LiNi_{0.85}Co_{0.15}O_2$ was used as the positive electrode active material. This was prepared in the same manner as in the production of the battery A11.

90 parts by weight of $LiNi_{0.85}Co_{0.15}O_2$ powder, 2 parts by weight of acetylene black, and 3 parts by weight of polyvinylidene fluoride powder were mixed together, to obtain a mixture. N-methyl-2-pyrrolidone was added to the resultant mixture, to form a positive electrode mixture paste. This positive electrode mixture paste was applied onto a positive electrode current collector made of a 15-µm-thick aluminum foil by a doctor blade process and thoroughly dried, to obtain a positive electrode.
(Non-aqueous Electrolyte Preparation)

A non-aqueous electrolyte was prepared by dissolving $LiPF_6$ at a concentration of 1.2 M in a solvent mixture of ethylene carbonate (EC) and ethyl methyl carbonate (DMC) in a volume ratio of 1:2.

A lithium secondary battery was produced in the same manner as in the production of the battery A2, except for the use of the negative electrode, positive electrode and non-aqueous electrolyte thus produced. The resultant battery was designated as a battery C1.
(Battery C2)
(Non-aqueous Electrolyte Preparation)

A non-aqueous electrolyte was prepared by dissolving $LiPF_6$ at a concentration of 1.2 M in a solvent mixture of ethylene carbonate (EC) and ethyl methyl carbonate (DMC) in a volume ratio of 1:2 and adding m-chloroperbenzoic acid thereto. The amount of m-chloroperbenzoic acid was made 0.5% by weight of the non-aqueous electrolyte.

A lithium secondary battery was produced in the same manner as in the production of the battery C1, except that this non-aqueous electrolyte was used and that no organic peroxide was added to the negative electrode. The resultant battery was designated as a battery C2.
(Battery C3)
(Positive Electrode Preparation)

90 parts by weight of $LiNi_{0.85}CO_{0.15}O_2$ powder, 2 parts by weight of acetylene black, 3 parts by weight of polyvinylidene fluoride powder, and 0.05 part by weight of m-chloroperbenzoic acid were mixed together, to form a mixture.

N-methyl-2-pyrrolidone was added to the resultant mixture, to form a positive electrode mixture paste. A lithium secondary battery was produced in the same manner as in the production of the battery C1, except that this positive electrode mixture paste containing m-chloroperbenzoic acid was used and that m-chloroperbenzoic acid was not added to the negative electrode. The resultant battery was designated as a battery C3.

(Comparative Battery 7)

A lithium secondary battery was produced in the same manner as in the production of the battery C1, except that no organic peroxide was added to the negative electrode. The resultant battery was designated as a comparative battery 5.

Using the batteries C1 to C3 and comparative battery 7, their battery capacities and capacity retention rates were obtained in the same manner as in Example 1. Table 3 shows the results. Table 3 also shows the parts to which the organic peroxide is added.

TABLE 3

|  | Part to which organic peroxide is added | Battery capacity (mAh) | Capacity retention rate (%) |
| --- | --- | --- | --- |
| Battery C1 | Negative electrode | 2865 | 83 |
| Battery C2 | Non-aqueous electrolyte | 2846 | 75 |
| Battery C3 | Positive electrode | 2822 | 69 |
| Comparative battery 7 | — | 2833 | 51 |

From the results of Table 3, it can be seen that the batteries C1 to C3 have improved capacity retention rates than the comparative battery 7. Also, it can be seen that in the case of the battery C1 with m-chloroperbenzoic acid included in the negative electrode, its cycle characteristics are improved more remarkably and in a less amount than in the case of the battery C2 with m-chloroperbenzoic acid added to the non-aqueous electrolyte and the battery C3 with m-chloroperbenzoic acid added to the positive electrode.

It should be noted that even the use of other organic peroxides than m-chloroperbenzoic acid resulted in essentially the same tendency.

INDUSTRIAL APPLICABILITY

The lithium secondary battery according to the present invention has a high capacity and improved cycle characteristics, so it can be used as a power source for personal digital assistants, portable electronic appliances, small-sized power storage device for home-use, two-wheeled motor vehicles, electric vehicles, hybrid electric vehicles, etc.

The invention claimed is:

1. A lithium secondary battery comprising:
a positive electrode including a positive electrode active material;
a negative electrode including a negative electrode active material; and
a non-aqueous electrolyte,
wherein said positive electrode active material comprises at least one lithium-containing composite oxide represented by the following general formula:

$Li_xM^1_{1-y}M^2_yO_2$ where $M^1$ and $M^2$ are different elements, $M^1$ being Ni or Co, and $M^2$ being at least one selected from Ni, Co, Mn, Mg, and Al, $1 \leq x \leq 1.05$, and $0 \leq y \leq 0.7$,
said negative electrode active material comprises at least one selected from the group consisting of silicon, tin, a silicon-containing alloy, and a tin-containing alloy,
said non-aqueous electrolyte includes m-chloroperoxybenzoic acid, and
said m-chloroperoxybenzoic acid accounts for 0.1 to 5% by weight of said non-aqueous electrolyte.

2. The lithium secondary battery in accordance with claim 1, wherein m-chloroperoxybenzoic acid is further included in said negative electrode.

3. The lithium secondary battery in accordance with claim 1, wherein said negative electrode active material comprises a silicon-containing alloy.

4. The lithium secondary battery in accordance with claim 3, wherein said silicon-containing alloy comprises: a solid solution including silicon and at least one transition metal element selected from the group consisting of Ti, Ni, Co, Fe, and Cu; or an alloy including silicon and at least one intermetallic compound selected from the group consisting of $TiSi_2$, TiSi, $CoSi_2$, CoSi, $FeSi_2$, FeSi, $NiSi_2$, NiSi, and $Cu_3Si$.

5. The lithium secondary battery in accordance with claim 4, wherein said intermetallic compound is $TiSi_2$.

6. The lithium secondary battery in accordance with claim 1, wherein m-chloroperoxybenzoic acid is further included in said positive electrode.

7. The lithium secondary battery in accordance with claim 2, wherein m-chloroperoxybenzoic acid is further included in said positive electrode.

8. A lithium secondary battery comprising:
a positive electrode including a positive electrode active material;
a negative electrode including a negative electrode active material; and
a non-aqueous electrolyte,
wherein said positive electrode active material comprises at least one lithium-containing composite oxide represented by the following general formula:

$Li_xM^1_{1-y}M^2_yO_2$ where $M^1$ and $M^2$ are different elements, $M^1$ being Ni or Co, and $M^2$ being at least one selected from Ni, Co, Mn, Mg, and Al, $1 \leq x \leq 1.05$ and $0 \leq y \leq 0.7$,
said negative electrode active material is at least one selected from the group consisting of silicon, tin, a silicon-containing alloy, and a tin-containing alloy, and
said negative electrode includes m-chloroperoxybenzoic acid.

9. A lithium secondary battery comprising:
a positive electrode including a positive electrode active material;
a negative electrode including a negative electrode active material; and
a non-aqueous electrolyte,
wherein said positive electrode active material comprises at least one lithium-containing composite oxide represented by the following general formula:

$Li_xM^1_{1-y}M^2_yO_2$ where $M^1$ and $M^2$ are different elements, $M^1$ being Ni or Co, $M^2$ being at least one selected from Ni, Co, Mn, Mg, and Al, $1 \leq x \leq 1.05$ and $0 \leq y \leq 0.7$,
said negative electrode active material is at least one selected from the group consisting of silicon, tin, a silicon-containing alloy, and a tin-containing alloy, and
said positive electrode includes m-chloroperoxybenzoic acid.

* * * * *